UNITED STATES PATENT OFFICE.

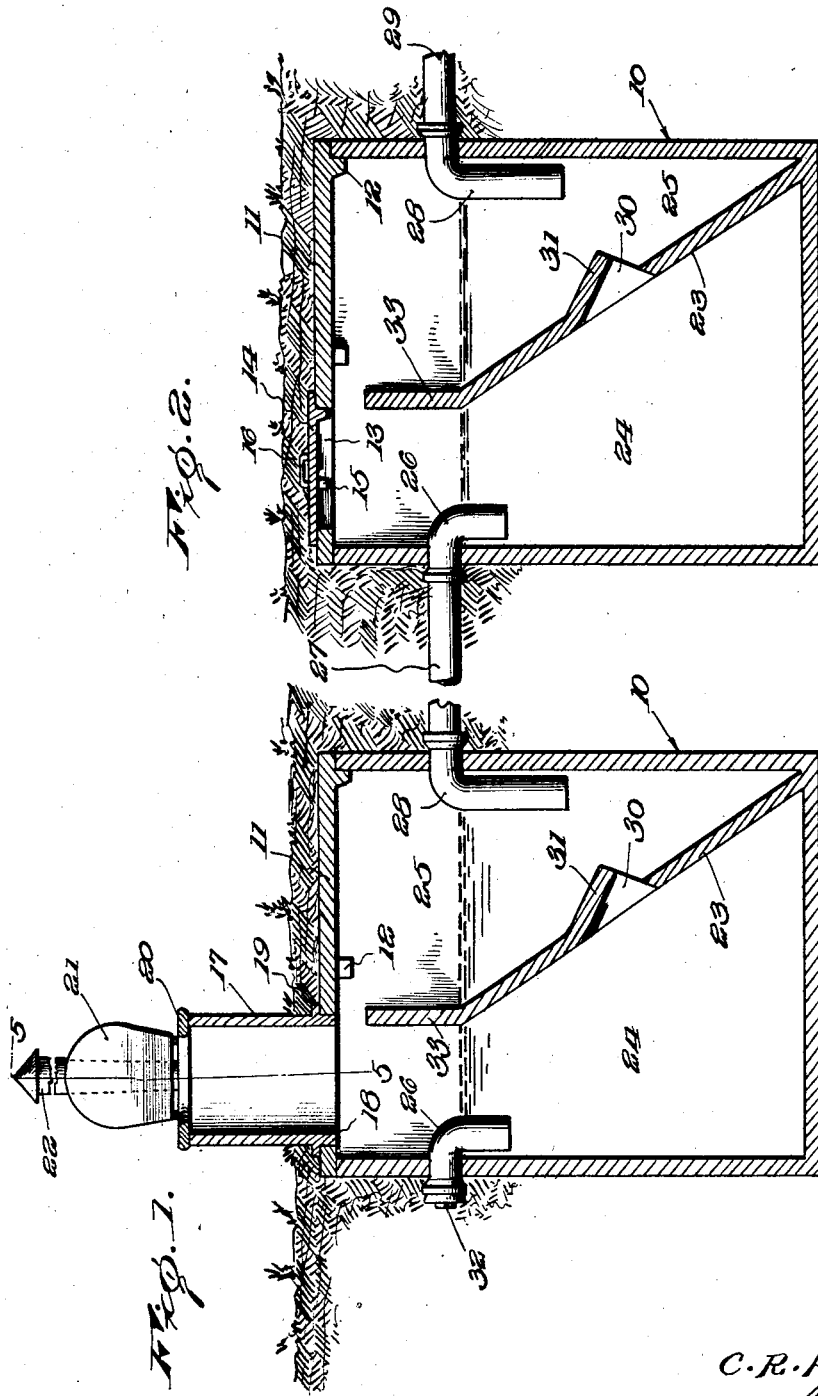

CHARLES R. HUMPHREYS, OF WILMINGTON, NORTH CAROLINA, ASSIGNOR, BY DIRECT AND MESNE ASSIGNMENTS, TO SANITARY EQUIPMENT CONSTRUCTION COMPANY, OF WILMINGTON, NORTH CAROLINA.

COMBINED SANITARY PRIVY AND SEPTIC TANK.

1,404,123.  Specification of Letters Patent.  Patented Jan. 17, 1922.

Application filed December 20, 1919. Serial No. 346,209.

*To all whom it may concern:*

Be it known that I, CHARLES R. HUMPHREYS, a citizen of the United States, residing at Wilmington, in the county of New Hanover and State of North Carolina, have invented certain new and useful Improvements in Combined Sanitary Privy and Septic Tanks, of which the following is a specification.

This invention relates to improvements in sewerage systems and more particularly to a combined sanitary privy and septic tank.

An important object of this invention is to provide a septic tank having a partition forming sludge and effluent chambers, said partition being inclined whereby the lower portion of the sludge chamber and the upper portion of the effluent chamber are enlarged to an appreciable extent for increasing the nitrification and efficiency of the tank.

A further object of this invention is to provide a septic tank wherein the partition between the sludge and effluent chambers is inclined with relation to the vertical axis of the tank so as to decrease the surface of the sludge chamber whereby the floating material in the upper portion of the sludge chamber is caused to assume an increased depth for increasing the efficiency and sanitation of the tank.

A further object of this invention is to provide a combined septic tank and privy wherein the opening between the sludge and effluent chambers is inclined for preventing any solid matter within the sludge chamber from passing into the liquefying or effluent chamber while rising or falling.

A further object of the invention is to provide a septic tank which is desirable in use, efficient, and relatively cheap to manufacture.

Other objects and advantages of the invention will be apparent during the course of the following description.

In the accompanying drawings forming a part of this application and in which like reference numerals are employed to designate like parts throughout the same:

Figure 1 is a vertical section through the improved septic tank having a privy seat applied thereto, Figure 2 is a vertical section through the tank, the same being connected with the sewerage system of a residence or other building.

In the drawings, the numeral 10 generally designates a septic tank which may be formed from non-rust iron or thin walled reinforced concrete, as desired. As illustrated in the drawings, the tank is of cylindrical formation so as not to form objectionable pockets in which solid particles may lodge. The top of the tank 10 is provided with a cylindrical cover 11 having a plurality of spaced depending lugs 12 engaging the inner side wall of the tank for securing the top in position. The cover is provided with an oval shaped opening 13 having a closure 14 detachably arranged therein and having a plurality of spaced depending lugs 15 engaging the wall of the opening 13 for securing the closure in position. The closure 14 may be readily removed through the medium of a handle 16 when it is desired to apply a privy 17 to the tank. The lower portion 18 of the privy 17 is received within the opening 13 and is provided with a lateral flange 19 engaging the adjacent portion of the cover 11 whereby the privy is supported by the closure. The upper portion of the privy is provided with a seat 20 having a hinged cover 21 and a vertical ventilating stack 22. Obviously, in the actual use of the privy, the same will be enclosed within a suitable housing to afford the necessary privacy.

As illustrated, the tank 10 is provided with an inclined or obliquely arranged partition 23 which serves to divide the tank into a sludge chamber 24 and a liquefying or effluent chamber 25. As is well known, an elbow 26 extended through the tank has its discharge end arranged below the level of the scum within the sludge chamber so that when the refuse enters through a sewerage pipe 27 the contents of the sludge chamber will not be disturbed to an appreciable extent. Also, the elbow 26 has its discharge end arranged above the solid material within the bottom of the sludge chamber so as not to disturb said solid material. The sewerage is discharged from the effluent chamber through the medium of a discharge elbow 28 which extends exteriorly of the tank and has connection with an open jointed tile pipe line 29 which extends to a seepage bed. The line 29 may, however, be of other material than tile and need not be open jointed.

It will be noted that an opening 30 is provided in the obliquely arranged partition by extending the intermediate portion 31 of said partition laterally. By inclining the partition 23, the lower portion of the sludge chamber 24 is increased in capacity for receiving the solid matter. Also, the surface of the sludge chamber is decreased for causing the floating material therein to assume a greater depth.

The particular advantage residing in causing the floating material within the sludge chamber to assume a relatively great depth is the fact that the purification and nitrification of the sewerage is greatly facilitated thereby. Solid sewerage upon entering the sludge chamber either sinks at once or in the course of a very short time. At the bottom of the sludge chamber it is, of course, attacked by anaerobic microbes that liquefy the larger part of this solid sewerage but not all at once. The portion of the sewerage not liquefied rises to the surface and forms a floating mat which the anaerobic microbes continue to work on until liquefied. However, the entire mat is never liquefied as more sewerage is being discharged into the sludge chamber all the time. Therefore there is always more volume of solid sewerage in the bottom of the sludge tank than the volume of the mat and so a greater capacity in the bottom of the sludge tank is provided.

The anaerobic microbes and the agents used in a septic tank to liquefy and destroy disease germs thrive best in darkness and without air so it follows that by appreciably increasing the depth of the floating mat the efficiency and sanitation of the tank is increased.

Also, by obliquely arranging the partition 23, the upper portion of the effluent chamber is increased in capacity so as to provide as much area above the inlet end of the discharge elbow 28 as possible. Any unliquefied or unpurified sewerage which passes through the opening in the partition rises to the upper portion of the fluid tank and is trapped above the inlet end of the discharge pipe 28. The unliquefied sewerage of course carries with it disease germs and anaerobic bacteria which continue to act upon the sewerage and destroy the disease germs. By thus trapping the unliquefied and unpurified sewerage above the inlet end of the discharge pipe 28, the anaerobic microbes are afforded an additional opportunity to destroy the disease germs contained in the sewerage and to liquefy said sewerage before the same is passed off through the pipe 28. In thus increasing the capacity of the upper portion of the effluent chamber, the sewerage upon being finally discharged from the tank will be purified to a high degree.

It will be noted that the offset portion 31 of the partition which forms the opening 30, is arranged in a downwardly inclined position so that any solid particles which may rise or fall within the sludge chamber will not pass through said opening. This also increases the nitrification of the sewerage and the efficiency of the tank in general.

The lower end of the partition joins the tank at the juncture of the bottom and one side of the same and intersects the longitudinal center of the tank so that the upper end of the partition is arranged on the opposite side of the longitudinal center of the tank. By this construction the total capacity of the sludge chamber is much in excess of the total capacity of the effluent chamber.

When the privy 17 is used in lieu of connecting the tank with the sewerage system of a residence or other building, a plug 32 is applied to the elbow 26. With reference to the drawings it will be noted that the partition 23 is obliquely arranged only up as far as the mat level of the several chambers and is extended vertically from that point, as indicated at 33, to form a guide for the material entering the tank from the privy.

In the manufacture of the tank, the partition 23 may, of course, be inclined to provide the desired capacity for each chamber with relation to the other chamber.

It is to be understood that the forms of the invention herewith shown and described are to be taken as preferred examples of the same and that such minor changes in arrangement and construction of parts may be made as will remain within the spirit of the invention and the scope of what is claimed.

Having thus described the invention, what is claimed as new is:

A septic tank having a partition therein dividing its interior into a sludge chamber and an effluent chamber, an inlet elbow in the wall of the sludge chamber having its discharge end below the liquid level in said chamber, and an outlet elbow in the wall of the effluent chamber having its inlet end below the liquid level therein, the partition being inclined upwardly from the wall of the effluent chamber toward the inlet elbow whereby the horizontal area of the sludge chamber increases downwardly and the horizontal area of the effluent chamber increases upwardly, and a passage being provided through the partition and inclined downwardly within the effluent chamber with its discharge below the outlet elbow.

In testimony whereof I affix my signature.

CHARLES R. HUMPHREYS. [L. S.]